US006102069A

United States Patent [19]

Di Betta et al.

[11] Patent Number: 6,102,069

[45] Date of Patent: Aug. 15, 2000

[54] DEVICE FOR SUCTION AND COLLECTION OF THE EXHAUST GASES OF A VEHICLE

[75] Inventors: Rosolino Di Betta, Reggio Emilia; Elio Baschieri, Gavasseto, both of Italy

[73] Assignee: Filcar S.r.l., Cella, Italy

[21] Appl. No.: 09/207,234

[22] Filed: Dec. 8, 1998

[30] Foreign Application Priority Data

Dec. 9, 1997 [IT] Italy ........................... BO97A 000708

[51] Int. Cl.[7] ...................................................... A01M 7/00

[52] U.S. Cl. .................... 137/351; 137/357; 137/355.16; 137/355.17; 137/580

[58] Field of Search ............................... 137/357, 355.17, 137/355.16, 351, 580, 234.6

[56] References Cited

U.S. PATENT DOCUMENTS

| | | | |
|---|---|---|---|
| 2,166,591 | 7/1939 | Hollister | 137/357 |
| 2,935,080 | 5/1960 | Klimek | 137/355.16 |
| 3,913,470 | 10/1975 | Cullen | 454/64 |
| 4,072,355 | 2/1978 | Pentith | 299/43 |
| 4,117,773 | 10/1978 | Johnson | 454/64 |

FOREIGN PATENT DOCUMENTS

| | | |
|---|---|---|
| 0174481 | 3/1986 | European Pat. Off. . |
| 9200289 | 2/1992 | Germany . |
| 296 08 811 U | 12/1996 | Germany . |
| 297 08 912 U | 7/1997 | Germany . |

*Primary Examiner*—A. Michael Chambers
*Attorney, Agent, or Firm*—Frost & Jacobs LLP

[57] ABSTRACT

Device for suction and collection of the exhaust gases of a vehicle, comprising a slotted suction duct, at least one carriage which is mobile along guide rails, with which there is integral one end of a flexible tube, by means of which the exhaust gases are sucked from the exhaust pipe of the vehicle; which device is characterised in that there are associated with the drive device of the carriage selective means for locking the drive wheel onto a shaft which is rotated by the drive device, and in that in all the operating steps, the drive wheel is always in purely rolling contact with the relative track.

11 Claims, 3 Drawing Sheets

DEVICE FOR SUCTION AND COLLECTION OF THE EXHAUST GASES OF A VEHICLE

BACKGROUND OF THE INVENTION

The present invention relates to a device for suction and collection of vehicle exhaust gases, to be carried out in particular on vehicle overhaul lines. Devices of this type can also advantageously be used in vehicle production plants.

Along the overhaul line, the vehicle, which is normally driven by its own engine, travels a short path in the garage, along which path there are various stations allocated to checking the emissions of the exhaust gases, the efficiency of the braking device, and the alignment of the steering equipment etc.

The purpose of the device which is the subject of the present invention is therefore to meet the need to suck the vehicle exhaust gases as they are emitted, following the vehicle during its displacements in the garage in which the said checks are carried out.

The devices of this type which are currently commercially available comprise a flexible tube, which is attached at one end to the exhaust pipe of the vehicle in transit, which tube is supported by a carriage suspended above the corresponding vehicle, such as to suck the exhaust gases produced, directly by means of an appropriate suction device.

In a complete operating cycle, a device of the type described comprises a first step, in which the vehicle itself drives the carriage by means of the suction tube, and a second step, in which, when the overhaul is completed, the end of the suction tube is automatically released from the exhaust pipe, and the carriage is returned to the beginning of the line by means of an appropriate movement device.

In other words, the operating cycle consists of two separate steps, i.e. a first, outward step, in which the carriage can freely run on the rail, driven by the vehicle itself , and a second step in which the carriage and the corresponding flexible tube are returned to the starting point by means of a drive device. The drive is switched on and off automatically as soon as the carriage passes over appropriate limit switches disposed on the line. In this type of system, all the operations are automated, and the operator does not have to intervene in any way. Normally, the flexible tube is raised during the return step by means of an appropriate raising device, in order to increase the safety of employees who may be present in the garage.

In some models, in the return step of the carriage, there is use of a drive wheel which is connected to this carriage, and is rotated by a corresponding drive device. In this return step, the drive wheel, which is normally of the friction type, can roll on an appropriate track which runs parallel to the slotted suction duct, whereas in the preceding, outward step, the friction wheel is moved away from the track, such that driving of the carriage by the vehicle, by means of the flexible tube, is not impeded by the resistance created by the gears which are present in the drive device.

A solution of this type is represented for example in European patent EP-B2-0 174 481 (JENZSCH et al.), in which the carriage is provided with a friction wheel, which is keyed directly onto the output shaft of an electric motor. The friction wheel and the corresponding motor are supported by a support which is pivoted such that rotation of this support, induced by the action of a magnetic device, makes the friction wheel engage on an appropriate track provided. The carriage can thus be moved by means of the electric motor, which, by transmitting motion to the friction wheel, which is now engaged with the track, induces consequent movement of the entire carriage. On the other hand, in the outward step, the same magnetic device rotates in the opposite direction the support which supports the motor and the friction wheel, thus moving the latter away from the guide.

Although this system has undeniable advantages compared with those of the prior art, it does not meet the requirements of simplicity and convenience which these mechanisms should have. In fact, the assembly which is constituted by the magnetic device and by the motor assigned for movement of the friction wheel, is very large, and requires a housing with large dimensions. In addition, as well as having the strength necessary to guarantee secure contact between the friction wheel and the track, the magnetic device must also support the suspended weight of this friction wheel and of the corresponding motor. Inter alia, the range of the rod of the magnetic device must be sufficient to guarantee efficient adherence and efficient detachment of the friction wheel from the track, in the two operating steps.

The two conditions previously described together require use of a very high-power magnetic device, with a consequent excess size of the supply system, and in particular of the electric transformer for the low voltage, with a corresponding increase in the overall cost of the system.

In addition, the device described in European patent EP-B2-0 174 481 can also be used as a system for braking the carriage, by supplying power to the magnetic device alone, which thrusts the friction wheel against the corresponding guide. In this operating condition the electric motor, on the shaft of which the friction wheel is keyed, is not operating. The entire carriage is therefore braked by dragging the friction wheel on the guide, since the wheel can no longer roll on the latter because it is locked by the gears which are present in the gear motor. This means that during the breaking step, the entire device acts in a manner which is not ideal, since it leads to localised wear in some areas of the friction wheel. A further consequence of this unsatisfactory operation consists in the fact that the supply voltage of the magnetic device is varied in order to modulate the braking; thus, if the voltage is not regulated satisfactorily, there is a risk either of supplying low force, which is insufficient to raise the gear motor and the wheel, or of supplying excessive force, which causes a sudden stoppage of the carriage and of the corresponding movement devices.

SUMMARY OF THE INVENTION

The object of the present invention is thus to provide a device for suction and collection of the exhaust gases of a vehicle, which is free from the above-described disadvantages.

According to the present invention, a device is provided for suction and collection of the exhaust gases of a vehicle, comprising a fixed, slotted suction duct, this suction duct extending along a specific, predetermined direction; at least one carriage which is mobile along guide rails, which also extend along this predetermined direction, with which carriage there is integral one end of a flexible tube, by means of which exhaust gases are sucked from the exhaust pipe of the vehicle, this end of the flexible tube being able to move freely in the slotted suction duct, such as to discharge into the latter the exhaust gases produced by the vehicle; at least one aspirator, which is connected to the slotted suction duct, and generates suction pressure in the slotted suction duct, and consequently in the flexible tube, and at least one device for driving the carriage, with which there is associated a drive wheel, this drive wheel engaging with appropriate guide means, inducing corresponding translation of the carriage along the predetermined direction; which device is characterised in that there are associated with this drive device selective means for locking the drive wheel onto a shaft which is rotated by the drive device, and in that in all the operating steps, this drive wheel is always in purely rolling contact with the guide means.

BRIEF DESCRIPTION OF THE DRAWINGS

In order to assist understanding of the present invention, a preferred embodiment is now described, purely by way of non-limiting example, with reference to the attached drawings, in which.

DETAILED DESCRIPTION OF THE INVENTION

Figure 1:
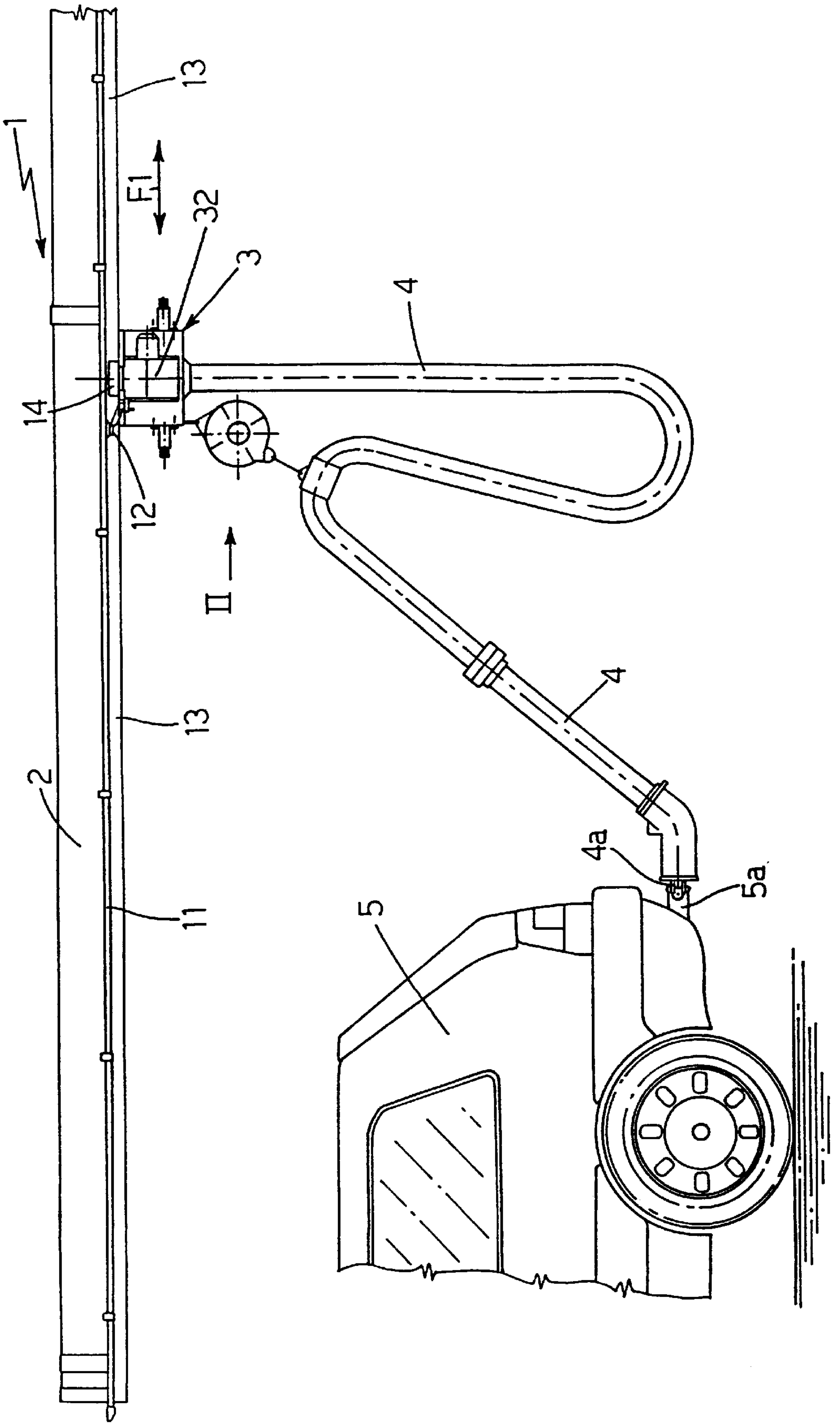
FIG. 1 illustrates a lateral view of a preferred embodiment of the device which is the subject of the present invention.
Figure 2:
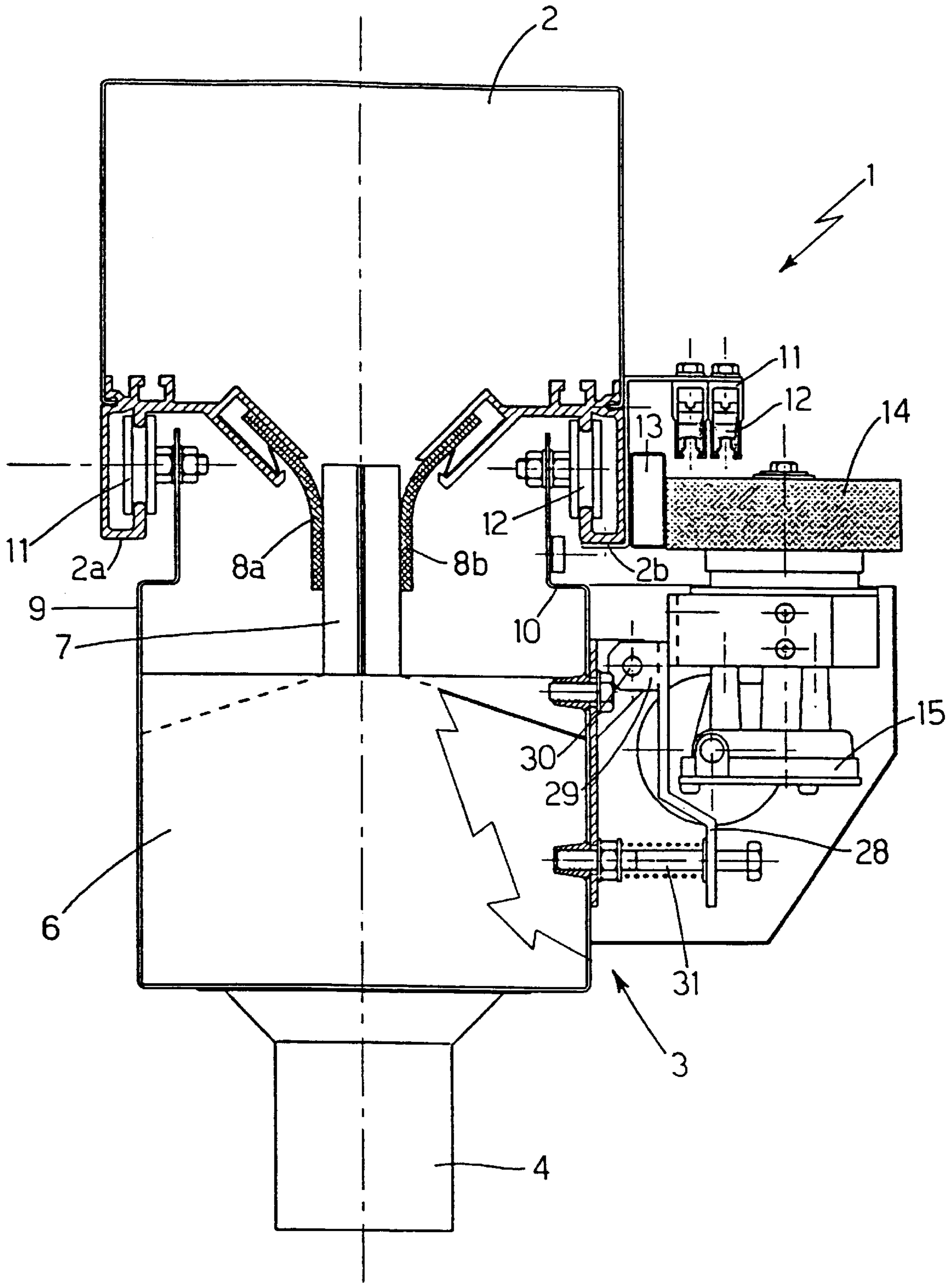
FIG. 2 illustrates the view according to the arrow II in FIG. 1, of part of the device shown in the preceding figure, from which some details have been eliminated in order to increase clarity.

FIGS. 1 and 2 show an important portion of the device 1 for suction and collection of the vehicle exhaust gases, which is the subject of the present invention.

In its general lines, this device 1 consists of a plurality of suction ducts 2 (only one of which is shown in the attached figures), suspended from the ceiling of the garage by at least one carriage 3, with which there is integral one end of a flexible tube 4; and at least one suction device (not shown in the figures), which generates suction pressure in the suction channel 2 and thus in the flexible tube 4 connected to the latter. The other end of the flexible tube 4, opposite the one which is integral with the carriage 3, can be attached by detachable means 4*a*, to the exhaust pipe 5*a* of the vehicle 5 (FIG. 1) to be subjected to testing.

As shown in particular in FIG. 2, the carriage 3 comprises a main body 6 which has a substantially prismatic shape, which acts as a link between the flexible tube 4 and the suction duct 2. In order to assist the intake of the exhaust gases generated by the vehicle 5 into the suction duct 2, the main body 6 has a nozzle 7 integral with the latter, which projects inside a pair of lips 8*a*, 8*b*, which act as resilient seals. The main body 6 supports brackets 9, 10, on which there are pivoted pairs of wheels 11, 12, which, by means of rails 2*a*, 2*b* supported by the slotted suction duct 2, support the entire weight of the carriage 3 beneath. The carriage 3 can thus be moved by means which will be described hereinafter, along two directions opposite one another, defined by the double-ended arrow F1.

As can be seen clearly in FIGS. 1 and 2, there is also provided an electrical supply rail 11 which is integral with the suction duct 2, by means of which power can be supplied both to the electrical devices which can drive the carriage, and to the electric clutch. This electrical supply rail 11 can consist of a copper bar which is partially covered by an insulating plastic material, such as to provide a slot in which there is inserted a brush 12, which, by sliding along the supply rail 11, guarantees sliding electrical contact by means of which power can be supplied to the electrical drive and clutch devices.

Integral with the suction duct 2 there can be provided a track 13 which consists of a tube, generally made of ferrous material, which is fitted along this suction duct 2. This track 13 has a continuous flat surface on which a drive wheel 14 exerts selectively the traction necessary in order to move the carriage 3.

Figure 3:
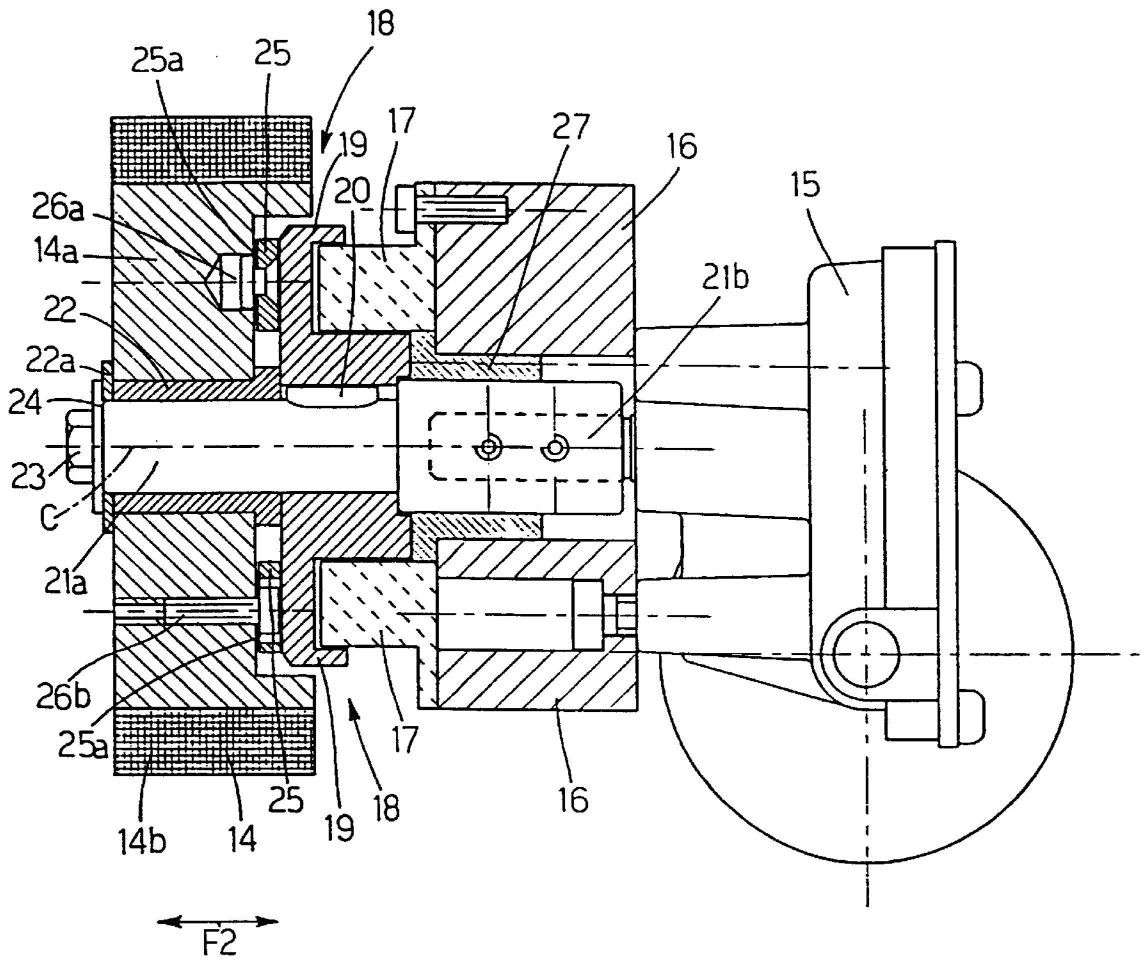
FIG. 3 shows on an enlarged scale the electric motor, the gear motor, the friction wheel, and an embodiment of the selective means for locking the friction wheel on the gear motor output shaft.

In the embodiment shown in FIG. 3, this drive wheel 14 comprises a hub 14*a* covered by a vulcanised layer 14*b*, which guarantees a reliable grip on the track 13. The carriage 3 is driven by means of a gear motor 15, to the flange 16 of which there is connected an electromagnetic stator 17, which is part of an electromagnetic clutch 18, which can transfer motion from the gear motor 15 to the wheel 14. In greater detail, as well as comprising the aforementioned electromagnetic stator 17, this electromagnetic clutch 18 comprises a rotor 19 which is keyed by means of a spline 20 onto the shaft 21*a* which is integral with the output shaft 21*b* of the gear motor 15. Coaxially to this shaft 21*a*, there is also inserted an idle bushing 22, which is integral with the hub 14*a* of the wheel. This bushing 22 is maintained in its seat by a 5th wheel 22*a*, clamped by a nut 23, with a washer 24 interposed. The third component of the electromagnetic clutch 18 consists of a ferrite ring 25 which can be brought into contact with the Brake lining surface of the rotor 19. Between the ferrite ring 25 and the hub 14*a*, there is interposed a thin ring 25*a* made of harmonic steel for springs. At three points which are offset by 120°, and by means of the rivets 26*a*, this ring 25*a* is secured to the ferrite ring 25, whereas at another three points, and by means of screws 26*b* which are also offset from one another by 120°, it is secured to the hub 14*a* of the friction wheel 14. When electric power is supplied to the electric winding (not shown in the figure), which is contained inside the stator 17, this creates an electromagnetic field which is propagated to the rotor 19, and magnetises it. The magnetic force which is output from the rotor 19 returns the ferrite ring 25, and the stress gives rise to elastic deformation of the harmonic steel ring 25*a*, which is sufficient to permit displacement towards the rotor 19 of the ferrite ring 25.

In other words, the action of the magnetic force forces the ferrite ring 25 to move along one of the two opposite directions determined by the double-ended arrow F2 (in FIG. 3 towards the right). Thus, this ferrite ring 25 is supported on the outer surface of the rotor 19, where, as already stated, there is provided a Brake lining layer (not shown in the figure) with a high friction coefficient. By this means the friction force renders the ferrite ring 25, which is connected mechanically to the drive wheel 14, integral with the rotor 19, which in turn is integral with the shaft 21*a*, which is the ideal continuation of the output shaft 21*b* of the gear motor 15. This therefore provides a mechanical connection between the drive wheel 14 and the gear motor 15. The configuration shown in FIG. 3 is thus obtained, in which there can clearly be seen the ferrite ring 25 which is supported on the outer surface of the rotor 19.

In this particular embodiment of the present invention, the drive wheel 14 is permanently in contact with the track 13, and when there is no electrical supply from the electromagnetic clutch 18, the drive wheel is idle on the shaft 21*a*, since it is mounted on this shaft 21*a* by means of interposition of the idle bushing 22.

By means of this arrangement, the carriage 3 can run freely by means of the two wheels 11, 12, which roll on respective tracks 2*a* and 2*b*, along the two opposite directions defined by the double-ended arrow F1. By this means the carriage 3 can be drawn along the duct 2 with minimum friction, since the wheel 14 rolls without dragging on the track 13, without simultaneously rotating the gears which belong to the gear motor 15, which gears would oppose considerable resistance to the free motion of the entire carriage 3.

It is immediately apparent that, when power is supplied to the gear motor 15 alone, without the clutch 18 being active, rotation nevertheless takes place of the shafts 21*a*, 21*b*, and thus also of the rotor 19 of the clutch 18. It can also easily be appreciated that the rotor 19 does not accidentally interfere with the other elements (stator 17, ferrite ring 25 etc), since its surfaces which are perpendicular to the longitudinal axis of symmetry C of the shaft 21 are clamped between the flanges of the bushing 22 and of the bushing 27, which also space appropriately the other adjacent elements (stator 17, ferrite ring 25 etc), in order to prevent unintentional sliding between the latter. In other words, if the gear motor 15 alone is activated, without magnetising the ferrite ring 25, the drive torque which is transmitted to the drive wheel 14 is negligible, and the wheel can therefore be considered idle on the shaft 21.

As can be seen from FIG. 2, once they have been assembled, the various drive elements form an autonomous unit which can easily be mounted on the carriage 3. This mounting is provided by means of a fork 28 which is integral with a bracket 29, which in turn is pivoted at 30 on the support structure of the carriage 3. The fork is subjected to the stresses of a resilient device 31, the thrust of which is adjustable by means of screws, and the function of which is to keep the drive wheel 14 pressed onto the track 13, such as to avoid unintentional sliding between this friction drive wheel 14 and the track 13. When it has been installed, the drive unit is screened by means of a housing 32 (FIG. 1), which in turn supports the supply brushes 12, which, as previously stated, can be inserted in the electrical supply tracks 11.

To summarise, three operating methods can be distinguished in the device which is the subject of the present invention:

(1) with the electromagnetic clutch 18 switched off, and the gear motor 15 not supplied with electric current, the carriage 2 is free to move, and can be drawn either by the vehicle 5 to which it is connected, or manually by an operator;

(2) with the electromagnetic clutch 18 switched on, and the gear motor 15 supplied with electric current, the carriage 2 can move autonomously by means of the drive provided by the gear motor 15, along the direction F1; the direction of travel can be changed by inverting the supply polarity, whereas the speed can be regulated by adjusting the supply voltage of the gear motor 15; and finally (3) with the electromagnetic clutch 18 switched on, and the gear motor 15 not supplied with electric current, the carriage 3 is braked, since the drive wheel 14 is engaged and the gear motor 15 is not rotating it; in fact, during the braking step, the drive wheel 14 continues to roll for a distance, giving rise to sliding between the ferrite ring 25 and the outer Brake lining surface of the rotor 19; in addition, the friction force created by the contact between the Brake lining of the rotor 19 and the ferrite ring 25, can be varied by selecting the supply voltage accordingly.

As already stated, this third operating mode can be used when the carriage 3 is to be braked. In fact, at the end of the overhaul line, the vehicles 5 which are leaving the line tend to accelerate before reaching the point of disconnection of the flexible tube 4 from the exhaust pipe 4*a* (FIG. 1). This means that the carriage 3 has excessive speeds towards the end of the suction duct 2, with the risk that it will strike against the limit switch stops. Thus, by using the third operating mode appropriately, it is possible to stop the carriage 3, simply by means of the action of the electromechanical clutch 18, which is controlled by an electronic card (not shown in the attached figures), which means that the voltage increases slowly in order to obtain gradual braking. Inter alia there can be associated with the wheel 14 a tachometric dynamo (not shown in the figures), which, in particular during braking, detects the instantaneous speed of this wheel 14, such as to influence retroactively the braking step itself. When the maximum voltage has been reached, and thus the carriage 3 has been stopped, power is supplied to the gear motor 15 after a short period of time. By this means there is certainty that the carriage 3 is restarted from a standstill.

However, the distinct improvement in relation to the devices of the prior art consists in the fact that during the braking step, the drive wheel 14 does not drag on the track 13, but rolls, and thus it does not become worn or deformed. In fact, the friction force which definitively gives rise to deceleration of the carriage 3 does not occur between the drive wheel 14 and the track 13, as it does in the known devices, but between the ferrite ring 25 and the outer Brake lining surface of the rotor 19.

It will be apparent to persons skilled in the art that the description provided with reference to the attached figures is simply an example of an embodiment of the present invention. Thus, still within the inventive context of the present invention, it is possible to conceive of other solutions which are equally valid, in which the selective means for locking the drive wheel 14 on the output shaft 21 of the gear motor 15 can consist of other electrical or mechanical clutch devices.

In a further embodiment, not shown, it is possible to use for example a centrifugal friction clutch in which the speed itself of the shaft 21*a* thrusts towards the exterior a plurality of segments, which are then supported with force on a cup-shaped element which is integral with the drive wheel 14. By means of a device which is shaped according to this further embodiment, it is possible to switch the clutch on and off, such that the drive wheel 14 is, or is not, engaged on the corresponding track 13.

Another embodiment, not shown, consists of a version in which the drive torque is transmitted by using a series of small teeth provided on the rotor 19 and on a element which is integral with the drive wheel 14; by this means the rotor 19 and the drive wheel 14 become integral with one another not by means of friction, as in the embodiment previously described, but by means of mechanical coupling between the two series of small teeth.

Finally, irrespective of the type of clutch selected, instead of the track 13 there can be used a rack, with which there is connected a corresponding toothed wheel, which, in this case, acts as a drive wheel.

What is claimed is:

1. Device (1) for suction and collection of the exhaust gases of a vehicle (5), comprising a fixed, slotted suction duct (2), the said suction duct (2) extending along a direction (F1); at least one carriage (3) which is mobile along guide rails (2*a*, 2*b*), which also extend along the said direction (F1), with which there is integral one end of a flexible tube (4), by means of which the exhaust gases are sucked from the exhaust pipe (5*a*) of the vehicle (5), the said end of the said flexible tube (4) being able to slide freely in the said slotted suction duct (2), such as to discharge into the latter the exhaust gases produced by the said vehicle (5); at least one aspirator, which is connected to the said slotted suction duct (2), and generates suction pressure in the said slotted suction duct (2), and consequently in the said flexible tube (4), and at least one drive device (15) for the said carriage (3), with which there is associated a drive wheel (14), the said drive wheel (14) engaging with appropriate guide means (13), and inducing corresponding translation of the said carriage (3) along the said direction (F1); which device is characterised in that there are associated with the said drive device (15) selective means (18) for locking the said drive wheel (14) onto a shaft **(21*a*) which is rotated by the said drive device (15) , and in that in all the operating steps, the said drive wheel (14) is always in purely rolling contact with the said guide means (13)**.

2. Device (1) as claimed in claim 1, in which the value of the contact force of pure rolling between the said drive wheel (14) and the said guide means (13) is predetermined by resilient means (31).

3. Device (1) as claimed in claim 1, in which the said selective means (18) for locking the said drive wheel (14) on an output shaft (21) of the said drive device (15) substantially consist of an electromagnetic rotor (19) which is integral with the said shaft (21), and of a first ring (25), which is preferably made of ferrite, connected to the said drive wheel (14).

4. Device (1) as claimed in claim 3, in which the said electromagnetic rotor (19) is magnetised by means of a stator (17).

5. Device (1) as claimed in claim 3, in which the said first ring (25) is subjected to the action of a second resilient ring **(25*a*), and is connected to the said wheel (14) by appropriate means (26*b*)**.

6. Device (1) as claimed in claim 1, in which the said selective means (18) for locking the said drive wheel (14) onto the shaft **(21*a*) consist of a centrifugal friction clutch, in which it is the speed itself of the said shaft (21*a*) which thrusts towards the exterior a plurality of segments, which are then supported with force on a cup-shaped element which is integral with the said drive wheel (14)**.

7. Device (1) as claimed in claim 3, in which the drive torque is transmitted by means of the mechanical coupling between a first series of small teeth provided on the said rotor (19), and a second series of small teeth provided on an element which is integral with the said drive wheel (14).

8. Device (1) as claimed in claim 1, in which the said drive wheel (14) is a friction wheel (14), and in which the said guide means (13) comprise a track (13).

9. Device (1) as claimed in claim 1, in which the said drive wheel (14) is a toothed wheel (14), and in which the said guide means (13) comprise a rack.

10. Device (1) as claimed in claim 1, in which the said selective means (18) are used in order to brake the advance of the said carriage (3), and in which the progressive braking operation is implemented by varying the supply voltage of the said locking means (18).

11. Device (1) as claimed in claim 10, in which there is associated with the said wheel (14) a tachometric dynamo, which detects the speed, moment by moment, of this wheel (14), such as to influence retroactively the braking step.

* * * * *